United States Patent [19]

Selbert et al.

[11] Patent Number: 4,765,045
[45] Date of Patent: Aug. 23, 1988

[54] METHOD OF MANUFACTURING TRIMMED SEAT

[75] Inventors: Alan J. Selbert, Tecumseh; Randy G. Eschelbach, Saline, both of Mich.

[73] Assignee: Hoover Universal, Inc., Ann Arbor, Mich.

[21] Appl. No.: 64,422

[22] Filed: Jun. 22, 1987

Related U.S. Application Data

[63] Continuation of Ser. No. 819,774, Jan. 16, 1986, abandoned.

[51] Int. Cl.$^4$ ............................................. B68G 7/00
[52] U.S. Cl. .................................. 29/91.1; 29/445; 29/451; 29/235; 5/474; 156/267; 297/452
[58] Field of Search ............... 29/91.1, 445, 451, 235; 5/402, 406, 407, 471, 472, 474, 481; 428/43; 156/257, 267, 268; 297/452, 455, 458

[56] References Cited

U.S. PATENT DOCUMENTS

| | | | |
|---|---|---|---|
| 2,804,419 | 8/1957 | De Waskin et al. | 156/267 |
| 3,320,108 | 5/1967 | Lande | 297/458 X |
| 3,576,059 | 4/1971 | Pearson | 29/91.1 |
| 3,649,974 | 3/1972 | Baruth et al. | 5/474 X |
| 3,971,112 | 7/1976 | Amato et al. | 29/91.1 |
| 4,040,881 | 8/1977 | Wallace | 29/91.1 X |
| 4,403,356 | 9/1983 | Urai | 297/458 X |
| 4,579,388 | 4/1986 | Urai | 297/452 |

FOREIGN PATENT DOCUMENTS

| | | | |
|---|---|---|---|
| 2262588 | 9/1975 | France | 297/252 |
| 241487 | 11/1985 | Japan | 29/91.1 |

Primary Examiner—Charlie T. Moon
Attorney, Agent, or Firm—Harness, Dickey & Pierce

[57] ABSTRACT

A vehicle seat having interconnected cushion and back members at least one of which consists of a foam body having an interior load supporting section and an outer peripheral section with a groove in the outer side of the body substantially at the juncture of the inner and peripheral sections. A first covering member is adhered to and lies flat against the outer side of the interior section and a second covering member is adhered to and lies flat against the outer side of the peripheral section. Both covering members extend into the groove and terminate in the groove. A flexible plastic trim strip is positioned in the groove at a position between the first and second members and is stitched to the members. In the process of this invention, the strip is supported in a groove in the tooling for making the seat and functions to hold the covering members in desired positions during the assembly of the foam body therewith. After the covering members are secured to the foam body and the seat section is removed from the tooling, the protruding portion of the trim strip is torn off.

4 Claims, 3 Drawing Sheets

METHOD OF MANUFACTURING TRIMMED SEAT

CROSS REFERENCE TO RELATED APPLICATION

This application is a continuation of application Ser. No. 819,774 filed Jan. 16, 1986, now abandoned.

BACKGROUND AND SUMMARY OF THE INVENTION

This invention relates generally to vehicle seats having interconnected cushion and back members and more particularly to a vehicle seat which is improved from the standpoints of comfort and appearance by virtue of the assembly of trim covering members with a foam body.

It is a desirable objective in seating of all types, particularly vehicle seating, to construct the cushion and the back sections of the seat so that they have interior load supporting sections bounded by peripheral sections which function as bolsters to impart a feeling of stability and comfort to the seat occupant. Such seats are desirably formed of a foam material with a covering material which conforms tightly to the surface of the foam body. In the seat and method of this invention, this is accomplished by using separate covering members to cover the interior section and the peripheral section and providing for the attachment of these members at the groove which is formed at the juncture of the sections.

The seat of this invention is provided with a trim strip, preferably formed of a bendable plastic material, which is sewn to the covering members at their juncture and positioned in the groove which defines the juncture of the interior section and the peripheral section. Initially, the strip is of a size to extend into a locating groove in the tooling which supports the covering members prior to their assembly with the foam body. This provides for an accurate location of the covering members in the tooling during assembly of the seat section.

The trim strip is of a size to be sewn to the covering members and also have a section that projects into a groove in the tooling. At the juncture of the strip portion which extends into the tooling with the body of the strip, the strip is of a reduced thickness to faciliate tearing. After the foam body has been adhered to the covering members, the assembled body with the covering members thereon is removed from the tooling and the tear strip is removed by tearing it off the sewn strip. The result is a vehicle seat section in which the covering members are tightly adhered to the foam body and conform to the surface irregularities and designs in the foam body. If desired, the interior and peripheral covering members can be formed of contrasting materials since different members are used in the covering of this invention.

The result is a process that is improved from the standpoints of repeatability and quality assurance and a seating product that is improved from the standpoints of appearance and comfort.

Further objects, features and advantages of this invention will become apparent from a consideration of the following description, the appended claims and the accompanying drawing in which:

Figure 1:
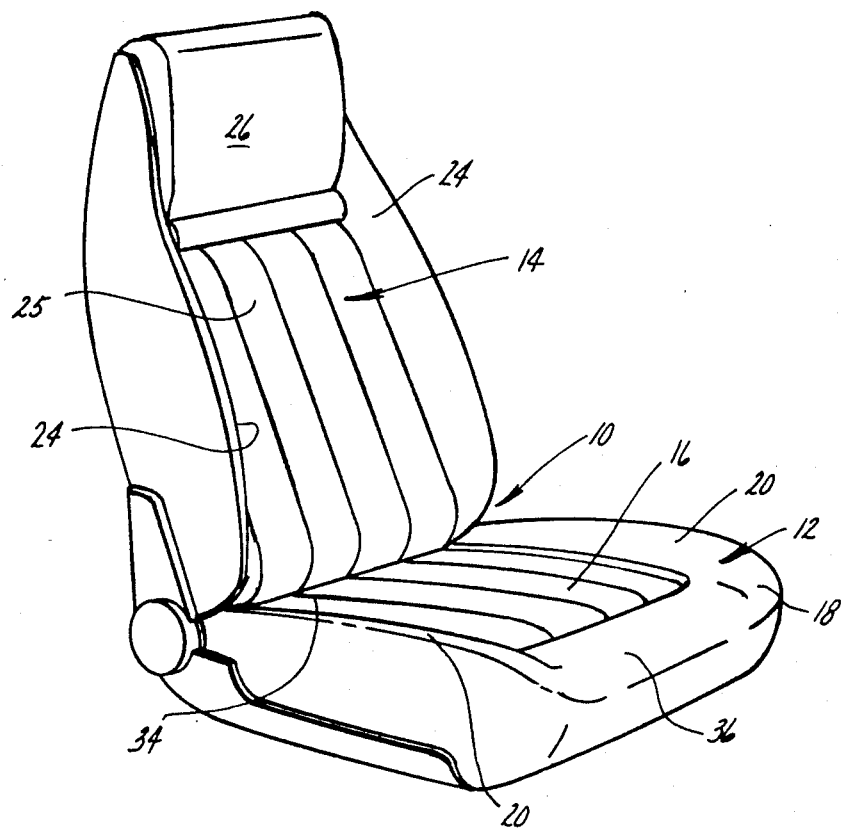
FIG. 1 is a perspective view of a vehicle seat embodying the improved cushion and back seat sections of this invention.
Figure 2:
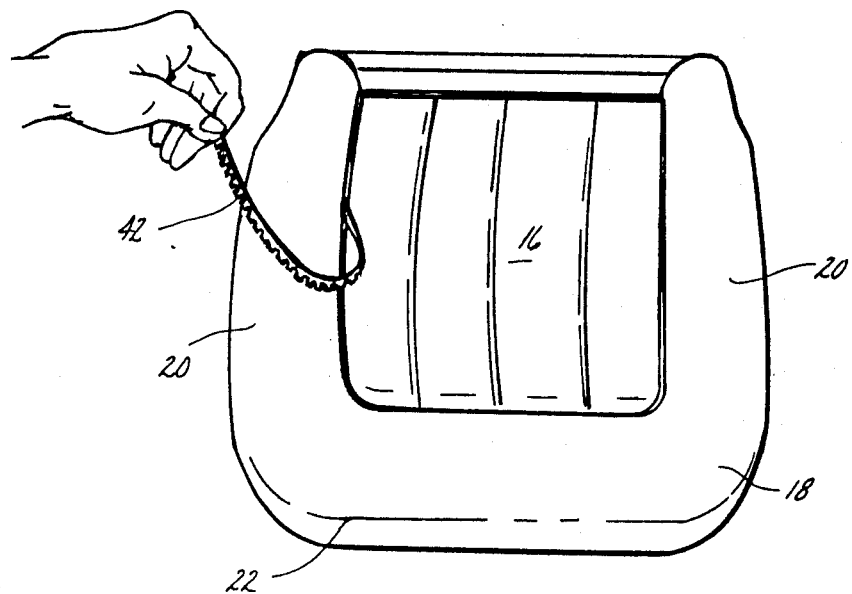
FIG. 2 is a plan view of the cushion section of the seat shown in FIG. 1 showing the removal of a portion of the trim strip that is removed following adherence of the covering members to the foam body.

With reference to the drawing, a vehicle seat embodying the novel features of this invention, indicated generally at 10, is illustrated in FIG. 1 as having interconnected cushion and back members 12 and 14, respectively. As shown in FIGS. 1 and 2, the cushion 12 has an interior load supporting section 16 and an outer section 18 which extends around the periphery of the interior section 16. The sides of the section 18, indicated at 20, function as bolsters and the front 22 functions as a thigh support and extends between the forward ends of the bolsters 20. The back 14 is similarly configured, having side bolster sections 24 and a head rest section 26 which extends between the ends of the sections 24 as well as an interior section 25.

Figure 3:
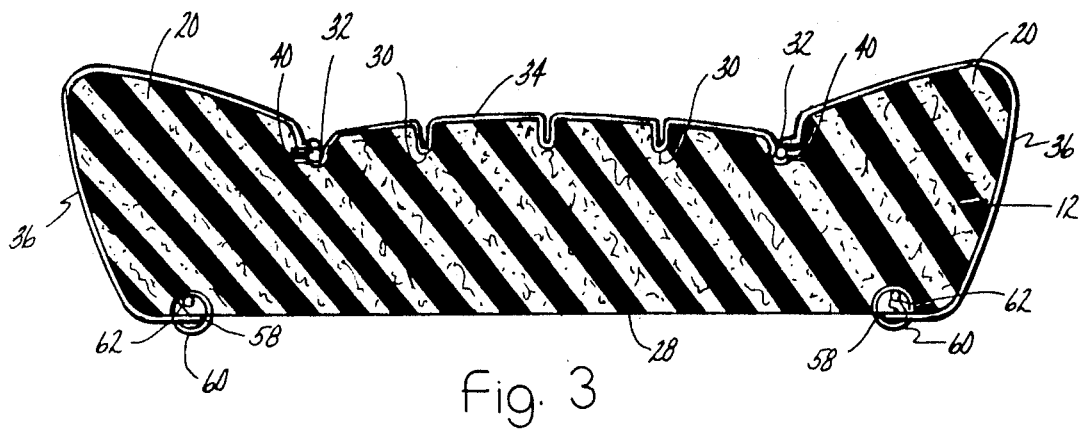
FIG. 3 is an enlarged transverse sectional view of the cushion section of the seat of this invention.
Figure 5:
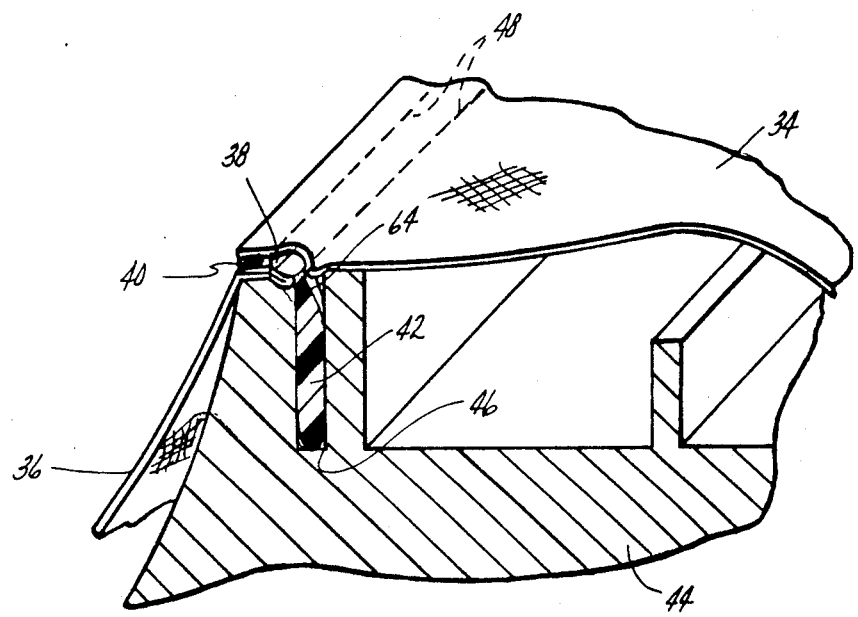
FIG. 5 is an enlarged fragmentary perspective view of some of the tooling used in the manufacture of the vehicle seat shown in FIG. 1 showing the assembly therewith of the trim strip, the interior covering member and the peripheral covering member.

As shown in FIG. 3, the cushion member 12 consists of a foam body 28 that is contoured to form the bolsters 20 and is provided with a plurality of grooves 30 that perform the double function of improving the appearance of the cushion 12 and sectionalizing the foam body 28 for improved comfort purposes. The foam body 28 also has a U-shape groove 32 located at the juncture of the cushion sections 16 and 18. A cover member 34 formed of the fabric or other material usually used to cover seats is positioned on the interior section 16 of the cushion 12. A second cover member 36 is positioned on the peripheral section 18, the cover members 34 and 36 terminating at the juncture groove 32. The cover members 34 and 36 extend into the groove 32 and are secured to each other and to a trim strip 38 that is positioned in the groove 32. The trim strip 38 is shown in FIG. 5 as including an inner section 40 which is positioned between the cover members 34 and 36 and a tear-off section 42 which projects outwardly from the cover members 34 and 36. The section 42 performs an important function during manufacture of the cushion 12 but is torn off, as shown in FIG. 2, following assembly of the foam body 28 with the covering members 34 and 36.

In the process for forming the cushion member 12, a specially shaped tool 44 (FIG. 5) is provided having a groove 46 corresponding to the juncture groove 32 in the body 28. The cover members 34 and 36 are initially sewn at their adjoining edges to the trim strip section 38, two stitch lines 48 being used to connect the cover members 34 and 36 to each other and to the trim strip 38. The tool 44 is shaped to conform to the top surface of the foam body 28, and for this reason, is formed with projections 50 corresponding to the grooves 30 and projections 52 corresponding to the groove 32.

Figure 6:
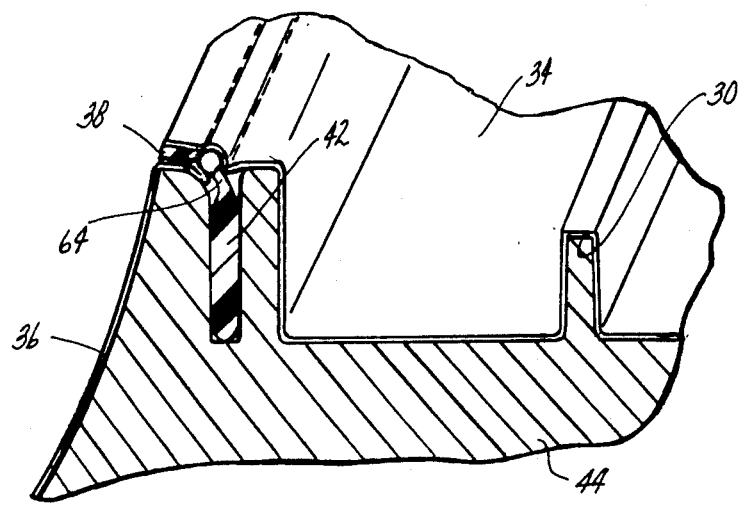
FIG. 6 is a fragmentary perspective view like FIG. 5 showing the covering members conformed to the shape of the tooling.
Figure 7:
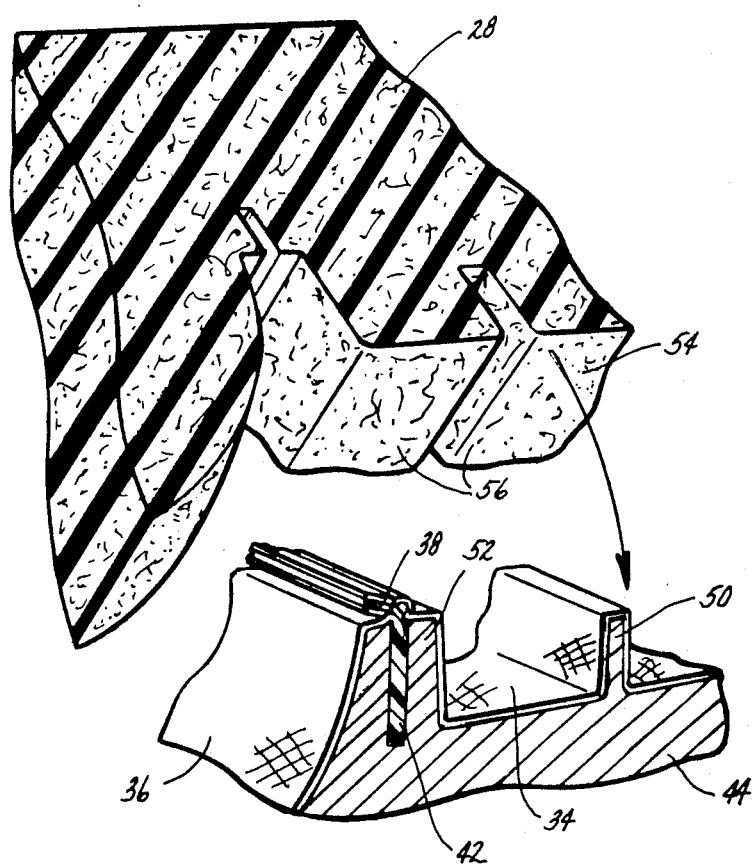
FIG. 7 is a fragmentary perspective view like FIGS. 5 and 6 showing the foam body being assembled with the trim strip and the covering members.

The plastic trim strip 42 is inserted into the groove 46 in the tool 44 to thereby locate the cover members 34 and 36 in desired positions on the tool 44. Heat is applied to the cover members 34 and 36 so that they will relax and conform accurately to the shape of the tool 44, as shown in FIG. 6. The foam body has an adhesive 54 applied to the entire top surface 58 and the body 28 is then inverted, as shown in FIG. 7, and applied upside down against the underside of the cover members 34 and 36 which are at this time on the tool 44. During assembly of the body 28 with the cover members 34 and 36, mild tension is maintained on the cover member 36 to insure its conformity with the irregular surface of the tool 44.

After a brief period, the cover members 34 and 36 are firmly adhered to the foam body surface 56 so that the foam body 28 with the cover members 34 and 36 thereon can be removed and the free edges 56 of the cover member 36 can be secured in any desired manner to the foam body 28 such as by hog rings 60 extended around embedded wires 62 in the foam body 28.

As shown in FIG. 5, the trim strip 42 has a reduced thickness section 64 at the juncture of the sections 40 and 42 which is slightly outwardly of the stitch lines 48. The section 42 is then readily torn from the section 40 by simply manual grasping of the section 42 as shown in FIG. 2. The section 40 remains hidden from view in the finished seat but functions to retain the cover members 34 and 36 in desired positions conforming to the outer surface 56 of the foam body 28.

Figure 4:
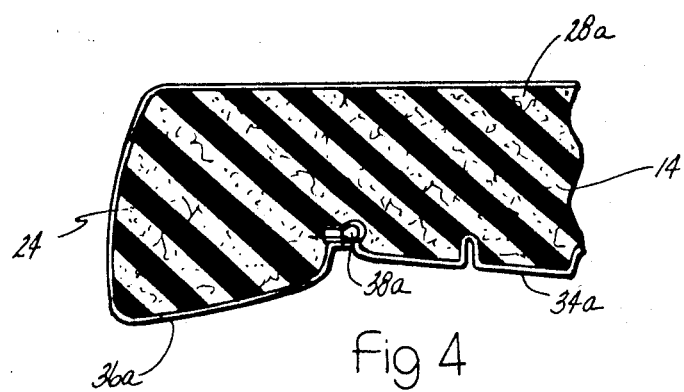
FIG. 4 is a fragmentary transverse sectional view of the back section of the seat of this invention.

As shown in FIG. 4, the seat back member 14 is similarly formed from a foam body 28a and cover members 34a and 36a connected by a trim strip 38a. The back member 14 is formed by the same process described above in connection with the cushion member 12. If desired, the cover member 36a can be extended across the entire backside of the foam body 28a for appearance purposes, as illustrated in FIG. 4.

From the above description, it is seen that this invention provides a vehicle seat having interconnected cushion and back members 12 and 14 which are formed to enhance occupant comfort and appearance of the seat 10. If desired, in each of the members 12 and 14, the interior section 16 and the peripheral section 18 can be formed of contrasting materials or contrasting colors to further enhance the appearance of the seat 10.

What is claimed is:

1. The method of making one part of a two part seat comprising forming a foam body having an interior load supporting section, bolster sections on transversely opposite sides of said load supporting section and a connecting section at one end of said interior section and extending between said bolster sections, and grooves at the junctures of said interior section with said bolster and connecting sections, said method comprising forming a first covering member of a size to lie flat against the top side of said interior section and extend at its outer edge into said grooves, forming a second covering member of a size to lie flat against the top side of said bolster and connecting sections and extend at its inner edge into said grooves, providing an upright trim strip of a size to extend into said grooves, inverting said covering members and securing the inner edge of said first member and the outer edge of the second member to an upper edge portion of said trim strip, positioning said trim strip so as to locate said first and second covering members at positions in which said first covering member can be accurately aligned with said interior load supporting section of said foam body prior to adhering of the foam body to said first covering member, inverting said foam body and moving it downwardly to a position in which said upper edge portion of said trim strip extends into said grooves, adhering said first covering member to said interior section of said body, turning said body over so that said covering members are on the top side of said foam body, extending said second member downwardly along the sides of said body and securing the second member to the underside of said body and tearing off all of said trim strip except said portion secured to said covering members.

2. The method according to claim 1 wherein said trim strip is formed with a reduced thickness section to enable tearing of the strip and facilitate said removal.

3. The method according to claim 1 wherein said covering members are secured by sewing to said trim strip.

4. In a vehicle seat having interconnected cushion and back members, the method of making the cushion portion comprising forming a foam body having an interior load supporting section, bolster sections on transversely opposite sides of said load supporting section and a thigh support section located forwardly of said interior section and between said bolster sections, and grooves at the junctures of said interior section with said bolster and thigh support sections, forming a first covering member of a size to lie flat against the top side of said interior section and extending at its outer edge into said grooves, forming a second covering member of a size to lie flat against the top side of said bolster and thigh support sections and extend at its inner edge into said grooves, providing an upright trim strip of a size to extend into said grooves, providing a trim tool shaped to conform to the shape of said foam body and having trim strip locating grooves corresponding to said grooves in said foam body, inverting said covering members and securing the inner edge of said first member and the outer edge of the second member to an upper edge portion of said trim strip, positioning said trim strip in said trim tool grooves so as to locate said first and second covering members at desired positions relative to said foam body when adhered thereto, inverting said foam body and moving it downwardly to a position in which said upper edge portion of said trim strip extends into said grooves, adhering said first covering member to said interior section of said body, turning said body over so that said covering members are on the top side of said foam body, extending said second member downwardly along the sides of said body and securing the second member to the underside of said body and removing all of said trim strip except said portion secured to said covering members.

* * * * *